(12) United States Patent
Alkhateeb et al.

(10) Patent No.: US 10,084,517 B1
(45) Date of Patent: Sep. 25, 2018

(54) MULTI-LAYERED PRECODING

(71) Applicant: Facebook, Inc., Menlo Park, CA (US)

(72) Inventors: Ahmed Alkhateeb, Fremont, CA (US);
Ali Yazdan Panah, San Francisco, CA (US); Qi Qu, Irvine, CA (US); Sam Alex, Dublin, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/626,140

(22) Filed: Jun. 18, 2017

(51) Int. Cl.
*H04B 7/04* (2017.01)
*H04L 25/03* (2006.01)
*H04B 7/0452* (2017.01)
*H04B 7/0456* (2017.01)
*H04W 88/08* (2009.01)
*H04W 28/04* (2009.01)

(52) U.S. Cl.
CPC ......... *H04B 7/0452* (2013.01); *H04B 7/0456* (2013.01); *H04L 25/03917* (2013.01); *H04L 25/03961* (2013.01); *H04W 28/04* (2013.01); *H04W 88/085* (2013.01)

(58) Field of Classification Search
CPC ... H04W 88/085; H04W 28/04; H04B 7/0452
See application file for complete search history.

(56) References Cited

U.S. PATENT DOCUMENTS

2010/0157924 A1* 6/2010 Prasad .................. H04L 1/0025
                                                           370/329
2018/0042003 A1* 2/2018 Chen ...................... H04W 76/10
2018/0042040 A1* 2/2018 Chen ................. H04W 72/1263

OTHER PUBLICATIONS

A. Adhikary, J. Nam, J. Y. Ahn and G. Caire, "Joint Spatial Division and Multiplexing—The Large-Scale Array Regime," in IEEE Transactions on Information Theory, vol. 59, No. 10, pp. 6441-6463, Oct. 2013.
A. Alkhateeb, G. Leus, and R. W. Heath, "Multi-layer precoding for full-dimensional massive MIMO systems," 2014 48th Asilomar Conference on Signals, Systems and Computers, Pacific Grove, CA, 2014, pp. 815-819.

(Continued)

*Primary Examiner* — Ross E Varndell
(74) *Attorney, Agent, or Firm* — Brian R. Short (57) ABSTRACT

Apparatuses, methods, and systems for precoding multi-carrier signals are disclosed. One method includes obtaining a transmission channel matrix between a terminal and a plurality of separate users, wherein the transmission channel matrix includes channel estimates for a plurality of subcarriers of the multi-carrier signal. A channel dimension reduction matrix is determined based upon a composite of the channel estimates for the plurality of subcarriers, wherein dimensions of the channel dimension reduction matrix are less than dimensions of the transmission channel matrix. The method further includes determining a precoding matrix for the terminal based on the channel dimension reduction matrix, wherein the precoding matrix is multi-carrier signal independent, determining an effective channel based on a channel estimate of the transmission channel and based on the precoding matrix of the terminal, and determining a precoding matrix for the central processing unit based on the effective channel.

20 Claims, 6 Drawing Sheets

(56) References Cited

OTHER PUBLICATIONS

A. Alkhateeb, G. Leus and R. W. Heath, "Limited Feedback Hybrid Precoding for Multi-User Milimeter Wave Systems," in IEEE Transactions on Wireless Communications, vol. 14, No. 11, pp. 6481-6494, Nov. 2015.

Limited Feedback Hybrid Precoding for Multi-User Millimeter Wave Systems Ahmed Alkhateeb, Student Member, IEEE, Geert Leus, Fellow, IEEE, and RobertW. Heath, Jr., Fellow, IEEE, IEEE Transactions on Wireless Communications, vol. 14, No. 11, Nov. 2015.

\* cited by examiner

Obtaining a transmission channel matrix between a plurality of antennas of a terminal and a plurality of spatially separate users, wherein the transmission channel matrix includes channel estimates for a plurality of subcarriers of the multi-carrier signals

410

Determining a channel dimension reduction matrix based upon a composite of the of the channel estimates for the plurality of subcarriers, wherein dimensions of the channel dimension reduction matrix are less than dimensions of the transmission channel matrix

420

Determining a precoding matrix for the terminal based on the channel dimension reduction matrix, wherein the precoding matrix is multi-carrier signal independent

430

Determining an effective channel based on a channel estimate of the transmission channel and based on the precoding matrix of the terminal

440

Determining a precoding matrix for the central processing unit based on the effective channel

MULTI-LAYERED PRECODING

FIELD OF THE DESCRIBED EMBODIMENTS

The described embodiments relate generally to wireless communications. More particularly, the described embodiments relate to systems, methods and apparatuses for precoding multi-carrier signal at multiple locations (layers).

BACKGROUND

C-RAN (Cloud-RAN (Radio Access Network)), sometimes referred to as Centralized-RAN, is a proposed architecture for cellular networks. C-RAN is a centralized, cloud computing-based architecture for radio access networks that supports 2G, 3G, 4G and future wireless communication standards. Its name comes from the four 'C's in the main characteristics of C-RAN system, "Clean, Centralized processing, Collaborative radio, and a real-time Cloud Radio Access Network".

Compared to a traditional cellular network, a C-RAN has a system structure, where distributed RF (radio frequency) units called remote radio head (RRH) receive the signals and communicates the signals to a centralized baseband unit (BBU) via front-haul. The front-haul is bandwidth limited.

It is desirable to have methods apparatuses, and systems for precoding multi-carrier signal at multiple locations (layers).

SUMMARY

An embodiment includes a method of precoding multi-carrier signals. The method includes obtaining a transmission channel matrix between a plurality of antennas of a terminal and a plurality of spatially separate users, wherein the transmission channel matrix includes channel estimates for a plurality of subcarriers of the multi-carrier signal, determining a channel dimension reduction matrix based upon a composite of the channel estimates for the plurality of subcarriers, wherein dimensions of the channel dimension reduction matrix are less than dimensions of the transmission channel matrix, wherein the terminal is one of a plurality of terminals interfaced with a central processing unit through a bandwidth limited front haul, wherein the terminal communicates with the plurality of spatially separate user with the multi-carrier wireless signals. The method further includes determining a precoding matrix for the terminal based on the channel dimension reduction matrix, wherein the precoding matrix for the terminal is multi-carrier signal independent, determining an effective channel based on a channel estimate of the transmission channel and based on the precoding matrix of the terminal, and determining a precoding matrix for the central processing unit based on the effective channel.

Another embodiment includes a system for precoding multi-carrier signals. The system includes a central processing unit operative to obtain a transmission channel matrix between a plurality of antennas of a terminal and a plurality of spatially separate users, wherein the transmission channel matrix includes channel estimates for a plurality of subcarriers. The central processing unit is further operative to determine a channel dimension reduction matrix based upon a composite of the channel estimates for the plurality of subcarriers, wherein dimensions of the channel dimension reduction matrix are less than dimensions of the transmission channel matrix, wherein the terminal is one of a plurality of terminals interfaced with a central processing unit, wherein the terminal communicates with the plurality of spatially separate user with multi-carrier wireless signals, determine a precoding matrix for the terminal based on the channel dimension reduction matrix, wherein the precoding matrix for the terminal is multi-carrier signal independent, determine an effective channel based on a channel estimate of the transmission channel and based on the precoding matrix of the terminal, determine a precoding matrix for the central processing unit based on the effective channel, communicate the precoding matrix for the terminal to the terminal, and apply the precoding matrix of the central processing unit to multi-carrier signals communicated between the central processing unit and the terminal, wherein the terminal is operative to apply the precoding matrix of the central processing unit to multi-carrier signals communicated between the central processing unit and the terminal.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for multi-layer precoding of multicarrier signals. A specific embodiment includes a cloud radio access network (RAN) system that includes a BBU (baseband unit) and multiple RRHs (remote radio heads). For an embodiment, precoding of signals communicated between an RRH and users is performed at the BBU and at the RRH. For an embodiment, the signals communicated between an RRH and users are multicarrier signals, and the precoding at the BBU is subcarrier dependent and the precoding at the RRH is subcarrier independent. For an embodiment, the precoding at the RRH is further simplified based on a distribution of user signal power across communication channels between the RRH and the users.

As previously stated, compared to a traditional cellular network, a C-RAN has a system structure, wherein distributed RF units called remote radio heads (RRHs) receives signals and communicates the signals to a centralized baseband unit (BBU) via front-haul. Further, the front-haul that supports communication between the BBU and each RRH is generally bandwidth limited.

Figure 1:
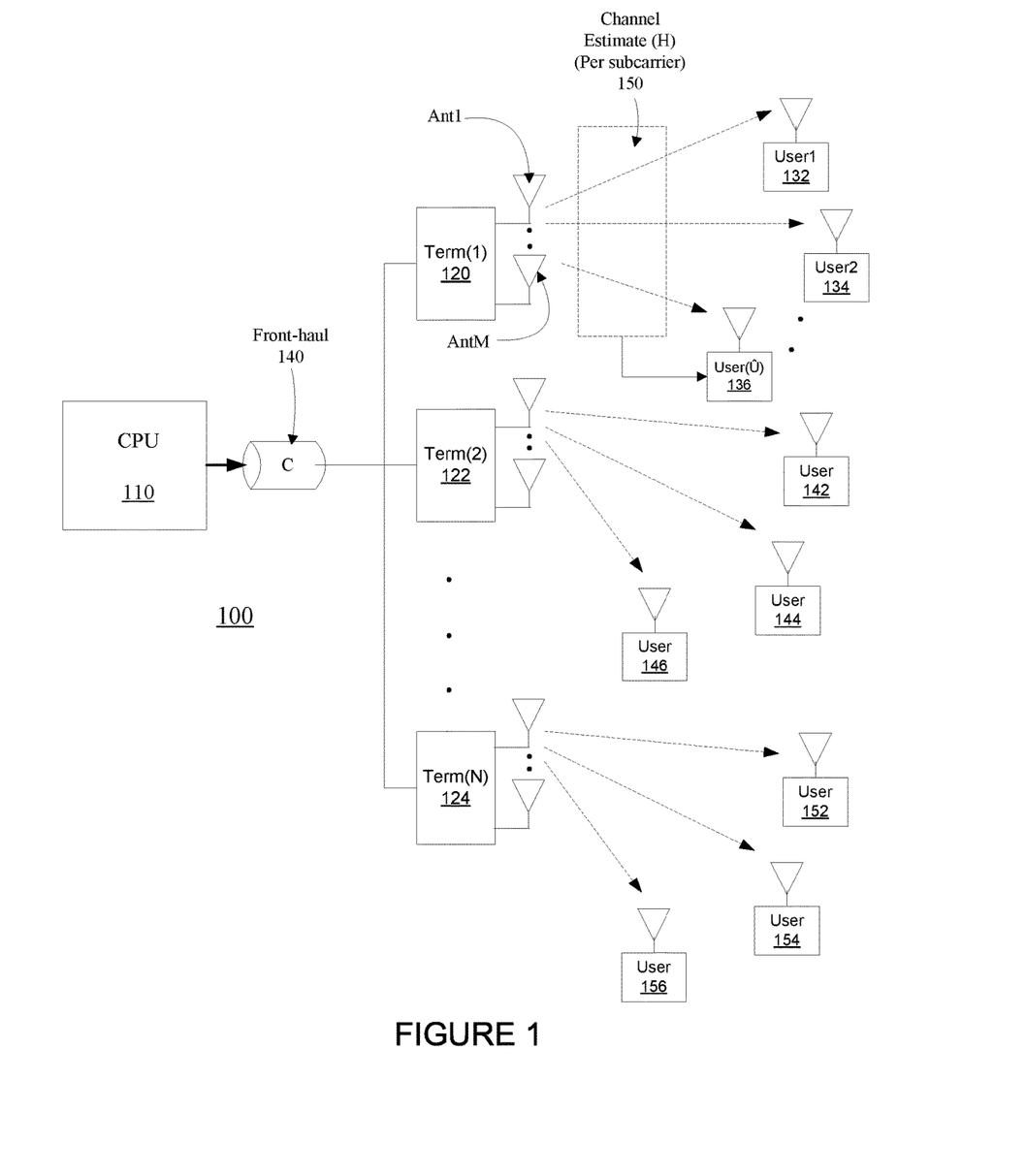
FIG. 1 shows a system for multi-layer precoding of multi-carrier signals, according to an embodiment.

FIG. 1 shows a system 100 for multi-layer precoding of multi-carrier signals, according to an embodiment. As shown a central processing unit 110 is interfaced with a plurality of terminals 120, 122, 124. Further, the terminals 120, 122, 124 are wirelessly connected to a plurality of users 132, 134, 136, 142, 144, 146, 152, 154, 156. For an embodiment, the system 100 includes a cloud radio access network (RAN) system, wherein the central processing unit 110 is a centralized baseband unit (BBU), the terminals 120, 122, 124 are remote radio heads (RRHs), and the BBU is interfaced with the RRHs through a bandwidth limited (C) front haul 140.

As previously stated, each of the terminals 120, 122, 124 is wirelessly interfaced with a plurality of users. For example, terminal 120 is wirelessly interfaced with users 132, 134, 136. For an embodiment, the terminals 120, 122, 124 include a plurality of M antennas. Further, for an embodiment, the users 132, 134, 136 each include a single antenna. Accordingly, a transmission channel between the terminal 120 and the users 132, 134, 136 can be determined and represented by an M×U matrix H, in which M is the number of antennas of the terminal 120 and U is the total number of users 132, 134, 136, 138, 142, 144, 146, 152, 154, 156 wirelessly connected to the terminal 120, and $\hat{U}$ (as depicted in FIGS. 1, 3, 5A, 5B, 6) is the number of users served by a terminal, where $0<\hat{U}<U$.

Various embodiments can be utilized for "training" the transmission channel between the terminal 120 and the users 132, 134, 136 to determine the M×U matrix H. For example, for an embodiment, training signals can be transmitted from the users 132, 134, 136 and received by the terminal 120. The measured responses at the terminal can be compared with known characteristics of the training signals to determine the M×U channel matrix H.

For at least some embodiments, the communication signals between the terminal 120 and the users 132, 134, 136 include multicarrier signals, such as OFDM (orthogonal frequency division multiplex) signals. For an embodiment, the characterization of the transmission channel between the terminal 120 and the users 132, 134, 136 includes channel characterizations at a plurality of the subcarriers of the multicarrier signals. Accordingly, for an embodiment, the training of the channel includes determining the M×U matrix H for each of J subcarriers of the multicarrier signals. For an embodiment, the training of the channel includes determining the M×U matrix H for at least a subset of the k subcarriers of the multicarrier signals For an embodiment, the layered precoding of the communication signals between the terminal 120 and the users 132, 134, 136 includes subcarrier dependent precoding at the central processing unit 110 and subcarrier independent precoding at the terminal 120. When the terminal 120 is transmitting signals to the users 132, 134, 136, the central processing unit 110 performing precoding on the multicarrier signals which are communicated to the terminal 120. The terminal 120 then performs additional precoding on the multicarrier signals before transmitting the multicarrier signals to the users 132, 134, 136. When the terminal 120 is receiving signals from the users 132, 134, 136, the terminal 120 performs precoding on the multicarrier signals received from the users 132, 134, 136. The terminal 120 then communicates the received multicarrier signals to the central processing unit 110, and the central processing unit 110 performing additional precoding on the received multicarrier signals.

For an embodiment, the central processing unit 110 is operative to obtain a transmission channel matrix H between the plurality of antennas of the terminal 120 and the plurality of spatially separate users 132, 134, 136, wherein the transmission channel matrix H includes channel estimates for a plurality of subcarriers. For an embodiment, the central processing unit 110 determines the precoding of the terminal based on the transmission channel matrix, wherein the precoding of the terminal is subcarrier independent. Further, for an embodiment, the precoding of the terminal is additionally determined based on a distribution of user signal power across a communication channel between the terminal and the users. For an embodiment, the central processing unit further determines the precoding of the central processing unit based on the precoding of the terminal and the transmission channel matrix, wherein the precoding of the central processing unit is subcarrier dependent.

For an embodiment, the precoding at the terminal 120 includes determining a channel dimension reduction matrix based upon a composite of the of the channel estimates for the plurality of subcarriers. For an embodiment, the composite includes a combination of the channel estimates for the plurality of subcarriers. For an embodiment, the composite includes an average of the channel estimates for the plurality of subcarriers. For at least some embodiments, the net result in combining the channel estimates for all or some of the subcarriers into a single channel estimate is a channel estimate that is subcarrier independent. The precoding at the terminal 120 is based at least in part upon the combined or composite channel estimate which is applied to the multicarrier signals communicated between the terminal and the spatially separate users 132, 134, 136. This reduces the complexity and reduces the amount of information communicated between the terminal and the spatially separate users 132, 134, 136.

Further, for at least some embodiments, the dimensions of the channel dimension reduction matrix are less than dimensions of the transmission channel matrix. For an embodiment, the dimensions of the channel dimension reduction matrix are determined based on a distribution of user signal power across the channel. That is, as will be described, based on the spatial distribution of the users, and the transmission channel environment surrounding the terminal and the users, the distribution of user signal power across the transmission channel will vary. The dimensions of the channel dimension reduction matrix can be selected based on an estimate or determination of the distribution of user signal power across the transmission.

As previously stated, for an embodiment, the precoding matrix for the terminal 120 is determined based on the channel dimension reduction matrix, wherein the precoding matrix is multi-carrier signal independent. For an embodiment, the precoding matrix for the terminal is communicated to the terminal 120. For an embodiment, the terminal 120 is operative to apply the precoding matrix of the central processing unit to multi-carrier signals communicated between the central processing unit and the terminal.

For an embodiment, determining the precoding matrix for the central processing unit includes determining an effective channel based on a channel estimate of the transmission channel and based on the precoding matrix of the terminal, and determining the precoding matrix for the central processing unit based on the effective channel. The precoding matrix of the central processing unit is then applied to multi-carrier signals communicated between the central processing unit and the terminal.

For an embodiment, determining a channel dimension reduction matrix includes determining a channel covariance matrix of the transmission channel between the plurality of antennas of the terminal and the plurality of spatially separate users. For an embodiment, determining a precoding matrix for the terminal based on the channel dimension reduction matrix comprises determining the precoding matrix for the terminal based on the channel covariance matrix, wherein the precoding matrix is multi-carrier signal independent.

For an embodiment, the precoding matrix of the central processing unit is updated more frequently than the precoding matrix of the terminal. For an embodiment, the precoding matrix of the terminal is updated based on long-term channel statistics. The long-term channel statistics are updated less frequently, or once every longer period of time, wherein the longer period of time if relative to the updating of the precoding at the central processing unit. The length of time between updates can be adaptively adjusted based on the channel dynamics (mobility of terminal and users, sense environment changes due to traffic, etc.). For example, a level of motion of the terminal and/or the users can be measured of determined, and the period of time between the determinations of channel statistics can be adaptively selected. For an embodiment, the precoding of the central processing unit is updated instantaneously.

For an embodiment, each of a plurality of terminal serves a group of users, and wherein the central processing unit comprises a precoding matrix for each of the terminals that is constructed as a block diagonal matrix, wherein each block of the block diagonal matrix is designed as a zero-forcing matrix for cancelling interference between users of the group of the corresponding terminal.

Figure 2:
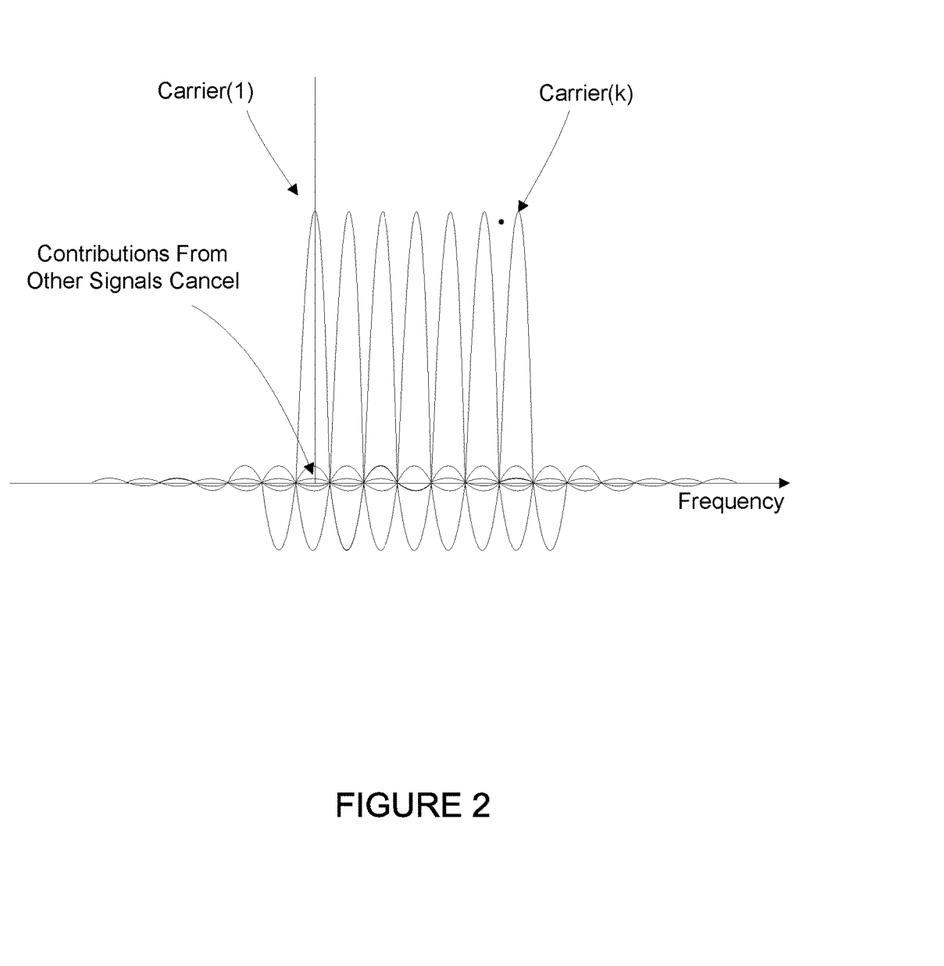
FIG. 2 shows a multi-carrier signal, according to an embodiment.

FIG. 2 shows a multi-carrier signal, according to an embodiment. The multicarrier signal includes multiple (J) carriers that are simultaneously communicated between a transmitter and a receiver. As described, for an embodiment, the communication between the terminals and the users includes multicarrier signals, such as, OFDM (orthogonal frequency division duplex) signals.

Frequency Division Multiplexing or OFDM is a modulation format that is being used for many of the latest wireless and telecommunications standards. OFDM has been adopted in the Wi-Fi arena where the standards like 802.11a, 802.11n, 802.11ac and more. It has also been chosen for the cellular telecommunications standard LTE/LTE-A, and in addition to this it has been adopted by other standards such as WiMAX and many more.

Although OFDM, orthogonal frequency division multiplexing is more complicated than earlier forms of signal format, it provides some distinct advantages in terms of data transmission, especially where high data rates are needed along with relatively wide bandwidths.

An OFDM signal consists of a number of closely spaced modulated carriers (such as the k carries of FIG. 2). When modulation of any form—voice, data, etc. is applied to a carrier, then sidebands spread out either side. It is necessary for a receiver to be able to receive the whole signal to be able to successfully demodulate the data. As a result when signals are transmitted close to one another they are spaced so that the receiver can separate them using a filter and there must be a guard band between them. This is not the case with OFDM. Although the sidebands from each carrier overlap, they can still be received without the interference that might be expected because they are orthogonal to each another. This is achieved by having the carrier spacing equal to the reciprocal of the symbol period.

The data to be transmitted on an OFDM signal is spread across the carriers of the signal, each carrier taking part of the payload. This reduces the data rate taken by each carrier.

The lower data rate has the advantage that interference from reflections is much less critical. This is achieved by adding a guard band time or guard interval into the system. This ensures that the data is only sampled when the signal is stable and no new delayed signals arrive that would alter the timing and phase of the signal.

One of the main advantages of OFDM is that is more resistant to frequency selective fading than single carrier systems because it divides the overall channel into multiple narrowband signals that are affected individually as flat fading sub-channels. Interference appearing on a channel may be bandwidth limited and in this way will not affect all the sub-channels. This means that not all the data is lost. Using close-spaced overlapping sub-carriers, a significant OFDM advantage is that it makes efficient use of the available spectrum. Another advantage of OFDM is that it is very resilient to inter-symbol and inter-frame interference. This results from the low data rate on each of the sub-channels. Using adequate channel coding and interleaving it is possible to recover symbols lost due to the frequency selectivity of the channel and narrow band interference. Not all the data is lost. One of the issues with CDMA systems was the complexity of the channel equalization which had to be applied across the whole channel. An advantage of OFDM is that using multiple sub-channels, the channel equalization becomes much simpler.

As previously described, for an embodiment, the transmission channel between a terminal and the users communicating with the terminal is characterized or estimated at each of J subcarriers of multicarrier signals of the communication. For an embodiment, the precoding of the terminal is based on a composite of the channel estimates of multiple of the subcarriers to make the precoding of the terminal subcarrier independent. For an embodiment, the precoding of the central processing is based on multiple channel estimates of the multiple subcarriers to make the precoding of the central processing unit subcarrier dependent.

Figure 3:
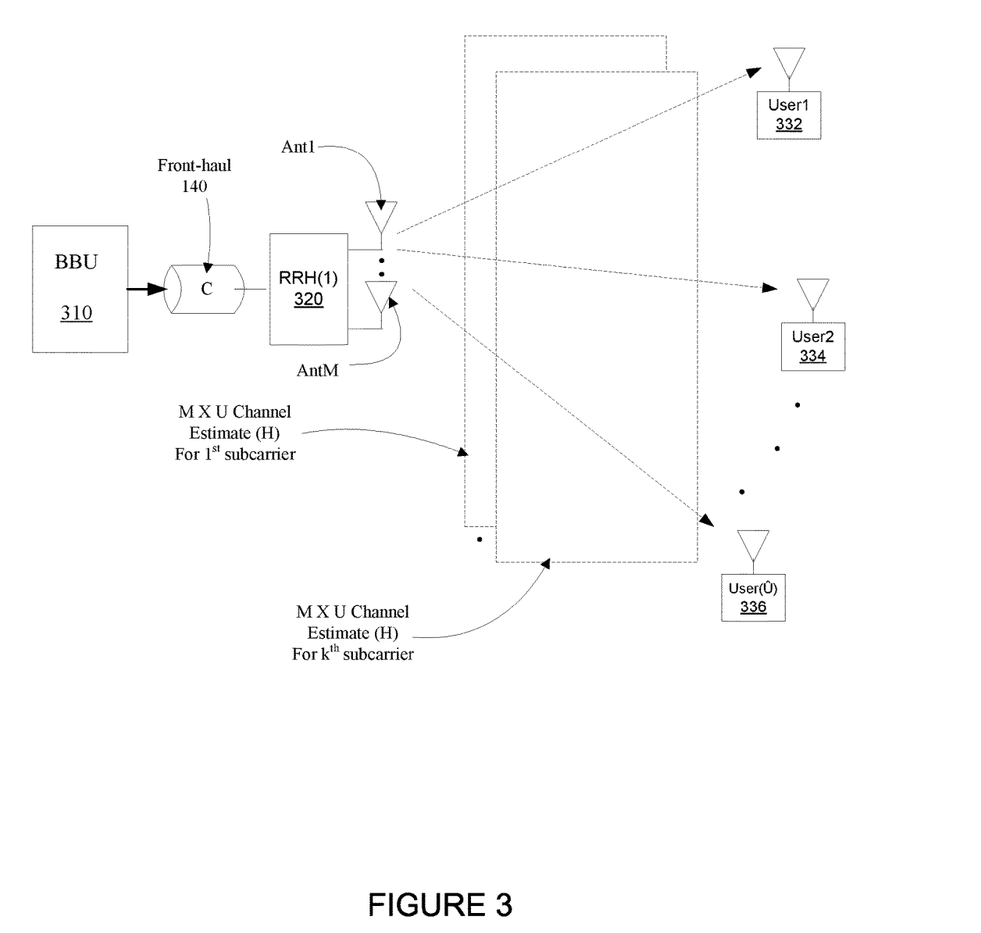
FIG. 3 shows a portion of a cloud radio access network (RAN) system, according to an embodiment.

FIG. 3 shows a portion of a cloud radio access network (RAN) system, according to an embodiment. An embodiment includes a C-RAN massive MIMO system as partially shown in FIG. 3. For an embodiment, the C-RAN massive MIMO system includes a BBU central processing unit 310 and N RRH terminals (that is, N RRHs, wherein one of the N RRHs is represented by RRH 320). For an embodiment, the RRH 320 includes M antennas. Further, for an embodiment, the RRH 320 has a limited feedback connection (front haul 140) of capacity C bps to the BBU unit 310. For an embodiment, the C-RAN massive MIMO system serves U users (such as, users 332, 334, 336). Communications signals between the RRH 320 and the users 332, 334, 336 include OFDM modulation having of J subcarriers.

As described, for at least some embodiments, the BBU 310 applies some precoding and the terminal 320 applies additional precoding. For an embodiment, in the downlink (communication from the RRH 320 to the users 132, 134, 136), the BBU 310 and RRH's collectively apply a precoding matrix $F_k$ for every subcarrier (individual subcarriers being referred to as "k") of the J subcarriers.

For at least some of the embodiments of multi-layer precoding the precoding matrix $F_k$ is written as a multiplication of two precoding matrices $$F_k = F^{RRH} F^{BBU}_k$$

where the matrix $F^{RRH}$ is an N M×N D precoding matrix applied at the RRH units and is common over all subcarriers, with D a reduced channel dimension parameter (to be described), and the matrix $F_k^{BBU}$ is a N D×U precoding matrix applied for subcarrier k at the BBU. Given the distributed nature of the RRH processing, the RRH precoding matrix $F^{RRH}$ can be further written in the following block-diagonal shape;

$$F^{RRH} = \begin{pmatrix} F_1^{RRH} & 0 & 0 \\ 0 & \ddots & 0 \\ 0 & 0 & F_N^{RRH} \end{pmatrix}$$

where $F_n^{RRH}$ is the M×D precoding matrix applied at the n-th RRH.

The decoupling of the BBU and RRH precoding has many advantages. First, it allows the reduction of dimensions captured by the dimension D. Second, the RRH and BBU precoding can be designed based on different time scales (that is, the precoding for the BBU can be updated at a different rate than the precoding of the RRH is updated). Finally, the multiplicative nature of multi-layer precoding as well as the reduction of dimensions makes it attractive for hybrid analog/digital architectures that reduce cost and power consumption.

For an embodiment, the RRH precoding matrices are determined at least in part based on large-channel statistics (channel covariance knowledge), and the BBU precoding based on the instantaneous knowledge of the effective channel (the channel multiplied by the RRH precoding matrices). That is, as previously stated, the RRH precoding is updated at a different rate than the updating of the BBU precoding. The RRH precoding is update much less frequently than the precoding of the BBU.

The precoding can be represented by letting $h_{n,u,k}$ denote the M×1 uplink channel vector between the u-th user and the n-th RRH at the k-th subcarrier. The covariance matrix of this channel can be calculated as;

$$R_{n,u,k} = E[h_{n,u,k} h_{n,u,k}^*].$$

If the SVD decomposition of the channel covariance matrix is $R_{n,u,k} = U_{n,u,k} \Lambda_{n,u,k} V_{n,u,k}$ then the overall covariance matrix of the U relevant users for the n-th RRH can be expressed as;

$$R_n = \sum_U \sum_{k=1}^{K} R_{n,u,k}$$

Note that the definition of the relevant users depends on the system and channel configuration. For example, if the users are grouped into groups, each one close to one of the RRH's, then the relevant users for every RRH can be set to be the users in the group close to this RRH.

Given this covariance matrix with the SVD decomposition $R_n = U_n \Lambda_n V_n$, the n-the RRH precoding matrix $F_n^{RRH}$ can be designed as;

$$F_n^{RRH} = \tilde{V}_n$$

where $\tilde{V}_n$ contains the D dominant (first) column vectors of the matrix $V_n$, which correspond to the D dominant singular values of $\Lambda_n$. Note that D is a design parameter, which captures the trade-off between reserving all the channel knowledge and reducing the dimensions of the effective channel $\bar{h}_{n,u,k} = F_n^{RRH*} h_{n,u,k}$.

After applying the RRH precoding, the overall N D×U effective channel matrix at the BBU can be written as;

$$\bar{H}_k = \begin{pmatrix} \bar{h}_{1,1,k} & \cdots & \bar{h}_{1,U,k} \\ \vdots & \ddots & \vdots \\ \bar{h}_{N,1,k} & \cdots & \bar{h}_{N,U,k} \end{pmatrix}$$

Based on this instantaneous channel matrix, the BBU precoding matrix is designed to manage the multi-user interference. For this target, several designs are possible depending on the user distribution and the global system objective.

Figure 4:
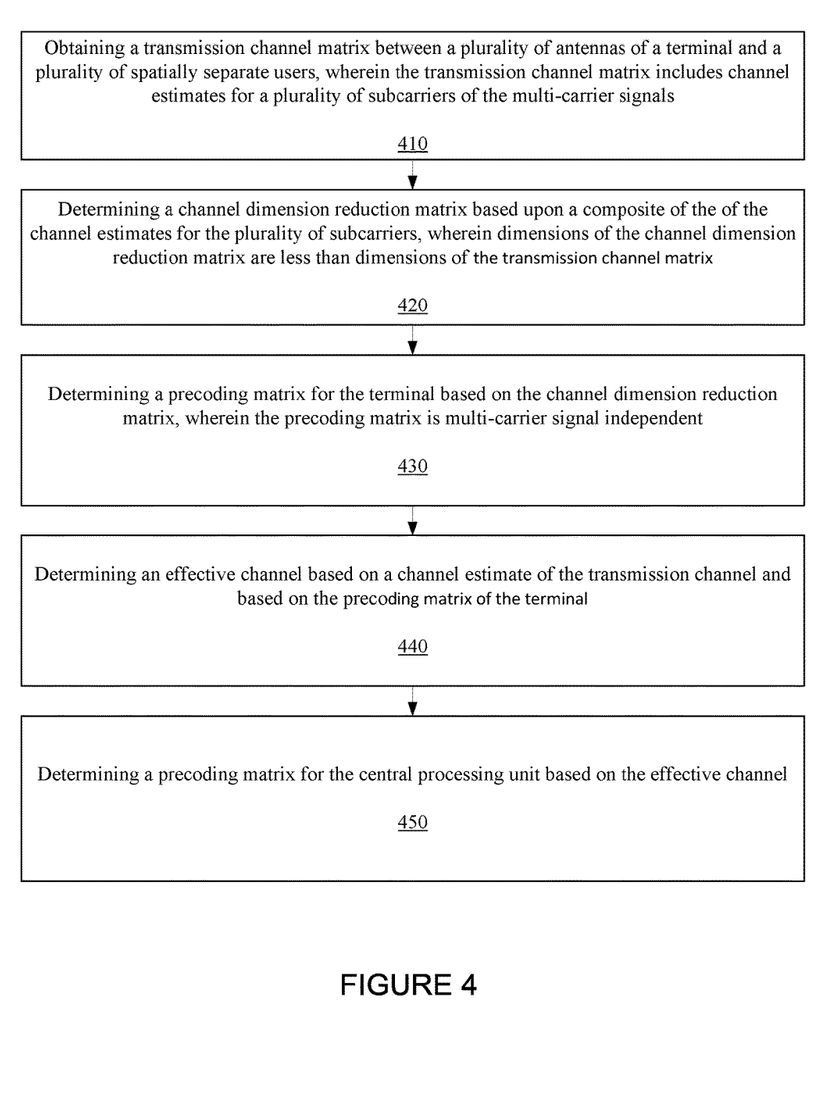
FIG. 4 is a flow chart that includes acts of a method of precoding multi-carrier signals, according to an embodiment.

FIG. 4 is a flow chart that includes acts of a method of precoding multi-carrier signals, according to an embodiment. A first step 410 includes obtaining a transmission channel matrix between a plurality of antennas of a terminal and a plurality of spatially separate users, wherein the transmission channel matrix includes channel estimates for a plurality of subcarriers of the multi-carrier signals. A second step 420 includes determining a channel dimension reduction matrix based upon a composite of the of the channel estimates for the plurality of subcarriers, wherein dimensions of the channel dimension reduction matrix are less than dimensions of the transmission channel matrix. For at least some embodiments, the terminal is one of a plurality of terminals interfaced with a central processing unit through a bandwidth limited front haul, and the terminal communicates with the plurality of spatially separate user with the multi-carrier wireless signals. A third step 430 includes determining a precoding matrix for the terminal based on the channel dimension reduction matrix. A fourth step 440 includes determining an effective channel based on a channel estimate of the transmission channel and based on the precoding matrix of the terminal. A fifth step 450 includes determining a precoding matrix for the central processing unit based on the effective channel.

For an embodiment, obtaining a transmission channel matrix between a plurality of antennas of a terminal and a plurality of spatially separate users, wherein the transmission channel matrix includes channel estimates for a plurality of subcarriers of the multi-carrier signals includes "training" the transmission channel between the terminal and the users to determine an M×U matrix H. For example, for an embodiment, training signals are transmitted from the users and received by the terminal. The measured responses at the terminal can be compared with known characteristics of the training signals to determine the M×U channel matrix H.

An embodiment further includes applying the precoding matrix of the terminal to multi-carrier signal communicated between the terminal and the spatially separate users. For an embodiment, this includes applying the precoding matrix to multicarrier signals before being transmitted to the users. For an embodiment, this includes applying the precoding matrix to multicarrier signals received from the users.

An embodiment further includes applying the precoding matrix of the central processing unit to multi-carrier signals communicated between the central processing unit and the terminal. For an embodiment, this includes applying the precoding matrix to multicarrier signals before being transmitted to the terminal. For an embodiment, this includes applying the precoding matrix to multicarrier signals received from the terminal.

Figure 5A:
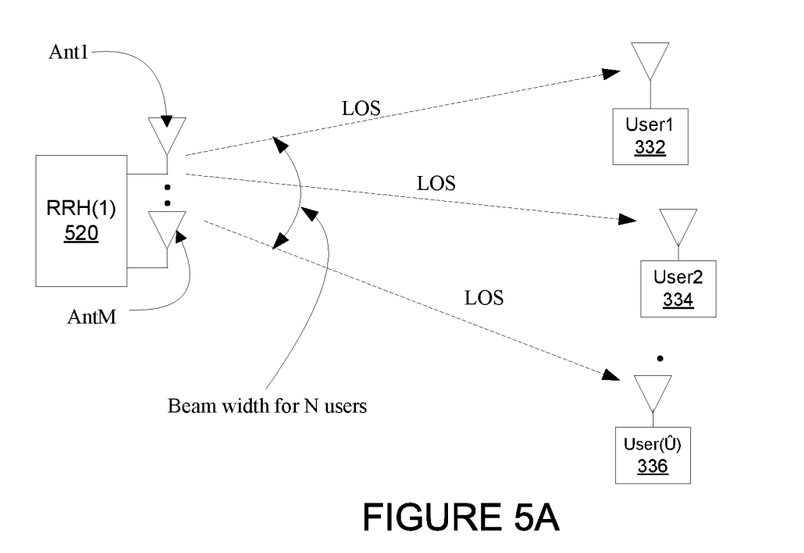
FIGS. 5A and 5B show terminal (remote radio head) having varying levels of distribution of user signal power across the transmission channel, according to some embodiments.
Figure 5B:
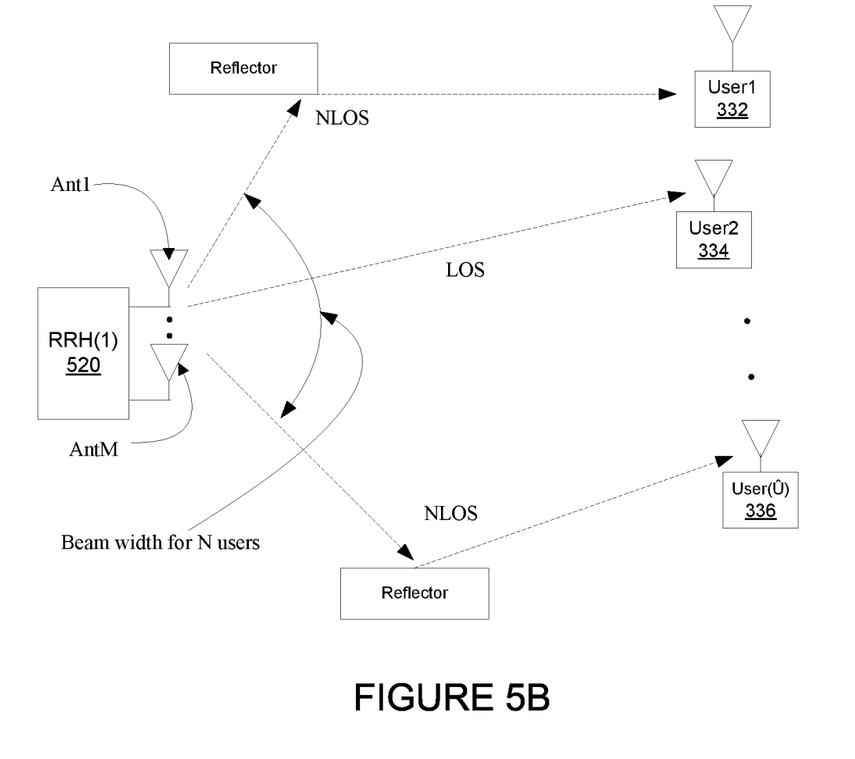

For an embodiment, the dimensions of the channel dimension reduction matrix are determined based on a distribution of user signal power across the channel. As shown in FIG. 5, depending upon a physical spacing between the users connected to a terminal, and the existence of direct line-ofsight (LOS) or non-direct-line-of-sight (NLOS), communication between a terminal and its users, the signal power of communication through the transmission channel between the terminal and the users can be distributed differently. The dimensions of the channel dimension reduction matrix can be selected based upon the level of distribution. For an embodiment, the distribution varies depending upon how wide or narrow a focus of beams formed between the terminal and the users of the terminal.

For an embodiment, determining a channel dimension reduction matrix comprises determining a channel covariance matrix of the transmission channel between the plurality of antennas of the terminal and the plurality of spatially separate users. A channel covariance matrix is one way of determining the channel dimension reduction matrix that reflects the distribution of the user signal power across the transmission channel.

For an embodiment, determining a precoding matrix for the terminal based on the channel dimension reduction matrix comprises determining the precoding matrix for the terminal based on the channel covariance matrix, wherein the precoding matrix is multi-carrier signal independent.

For an embodiment, the precoding matrix of the central processing unit is updated more frequently than the precoding matrix of the terminal. As previously described, for an embodiment the precoding matrix of the central processing unit is updated instantaneously. Further, the precoding matrix of the terminal is updated much less frequently. For an embodiment, the precoding matrix of the terminal is updated less frequently than the precoding matrix of the central processing unit, but dynamically updated based upon how much the transmission channel between the terminal and the users is changing.

For an embodiment, each of a plurality of terminal serves a group of users, and wherein the central processing unit includes a precoding matrix for each of the terminals that is constructed as a block diagonal matrix. For an embodiment, each block of the block diagonal matrix includes a precoding matrix for cancelling interference between users of the group of the corresponding terminal. For an embodiment, the precoding matrix of the central processing unit includes at least one of a zero-forcing matrix, a MMSE (Minimum Mean Square Error) matrix, or a regularized zero forcing matrix.

For an embodiment, each of a plurality of terminal serves a group of users, and wherein the central processing unit comprises a precoding matrix for each of the terminals that is constructed as a block diagonal matrix, wherein each block of the block diagonal matrix is designed as a zero-forcing matrix for cancelling interference between users of the group of the corresponding terminal.

As previously described, for an embodiment, the terminal includes a remote radio head (RRH) of a C-RAN system. Further, for an embodiment, the central processing unit includes a baseband unit (BBU) of a C-RAN system.

FIGS. 5A and 5B show terminal (remote radio head) having varying levels of distribution of user signal power across the transmission channel, according to some embodiments. As previously described, for an embodiment, the dimensions of the channel dimension reduction matrix are determined based on a distribution of user signal power across the transmission channel. FIG. 5A shows one possible user signal power distribution, and FIG. 5B shows another possible signal power distribution.

FIG. 5A shows an RRH 520 that communicates with the users 532, 534, 536 through line-of-sight (LOS) channels and the users 532, 534, 536 are physical grouped together closely. Therefore, the required beam width of the directional beams formed to support communication between the terminal 520 and the users 532, 534, 536 is narrow. In contrast, FIG. 5B shows an RRH 580 that communicates with users 592, 594, 596 through both non-line-of-sight (NLOS) and LOS channels and the users are physical grouped together less-closely than the users 532, 534, 536 of FIG. 5A.

For an embodiment, the distribution of user signal power across the transmission channel is determined based on the beam width of the directional beams required to communicate with the users of the RRH or terminal. For example, the beam width between the directional beams formed between the terminal 520 and the users 332, 334, 336 is much narrower in FIG. 5A than for FIG. 5B. Accordingly, for an embodiment, the dimensions of the channel dimension reduction matrix can be selected based on the beam width of directional beams formed between the terminal 520 and the users 332, 334, 336. For an embodiment, the value of D of the described embodiments can be selected based on the beam width of directional beams formed between the terminal 520 and the users 332, 334, 336.

While beam width is one parameter that can be used to estimate or determine the distribution of user signal power across the transmission channel, other parameters can also be used. Such a parameter reflects the scattering of the transmission channel. For an embodiment, the rank of covariance of channel can be used to estimate or determine the distribution of user signal power across the transmission channel.

Figure 6:
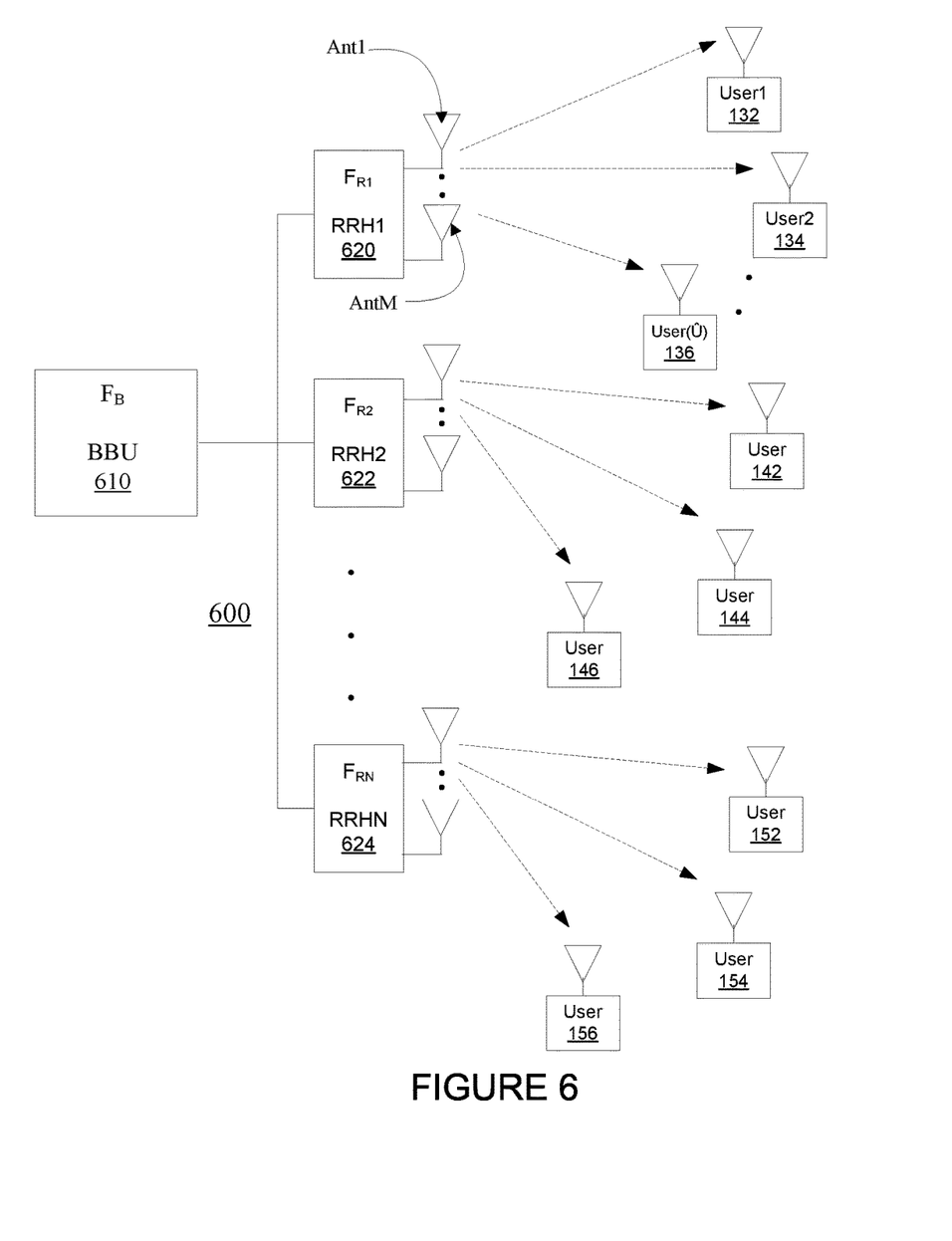
FIG. 6 shows a cloud radio access network (RAN) system including a precoding matrix at the baseband unit and precoding matrices at the remote radio heads, according to an embodiment.

FIG. 6 shows a cloud radio access network (RAN) system including a precoding matrix at the baseband unit and precoding matrices at the remote radio heads, according to an embodiment. As shown in FIG. 6, the BBU 610 applies a precoding matrix FB to multicarrier signals communicated between the BBU 610 and the N RRHs 620, 622, 624. Further, each of the RRHs 620, 622, 624 apply precoding matrices FR1, FR2, FRN to multicarrier signals communicated between each of the RRHs 620, 622, 624 and the corresponding set of users 132, 134, 136, 142, 144, 146, 152, 154, 156.

At least some embodiments further include intra-group interference cancellation. For at least some embodiments, the users are distributed into groups, such that every RRH is serving one group. For an embodiment, the groups are far from each other and inter-group interference is negligible. In this case, for an embodiment, the BBU precoding matrix is constructed as a block diagonal matrix, with each block designed as a zero-forcing matrix to cancel the interference between the group of one RRH. Mathematically, this BBU precoding matrix can be written as;

$$F^{BBU} = \begin{matrix} F_{1,k}^{BBU} & 0 & 0 \\ 0 & \ddots & 0 \\ 0 & 0 & F_{N,k}^{BBU} \end{matrix}$$

where each BBU precoding sub-block $F_{n,k}^{BBU}$ is responsible for the cancelling the interference between the users served by the n-th RRH, and is constructed as;

$$F_{n,k}^{BBU} = \overline{H}_{gn,k}(\overline{H}_{gn,k}*\overline{H}_{gn,k})^{-1}$$

where $\overline{H}_{gn,k}$ is the $D \times \tilde{U}$ effective channel matrix constructed by concatenating the effective channel vectors that correspond to the $\tilde{U}$ relevant users of the n-th RRH.

At least some embodiments include joint intra-group and inter-group interference cancellation. If the U users are close to each other, and not geographically distributed, such there mutual interference cannot be neglected, the BBU precoder is designed to cancel the multi-user interference between all the users. This is done by constructing the BBU precoding matrix $F_k^{BBU}$ as a zero-forcing matrix of the overall effective channel matrix, i.e.

$$F_k^{BBU} = \overline{H}_k (\overline{H}_k^* \overline{H}_k)^{-1}$$

This choice of which precoding method to follow depends on the user distributions, the positions of the RRH's and the different system parameters. That is, for example, at the BBU, the choice between using zero forcing, MMSE, or regularized zero-forcing.

Although specific embodiments have been described and illustrated, the embodiments are not to be limited to the specific forms or arrangements of parts so described and illustrated. The described embodiments are to only be limited by the claims.

What is claimed:

1. A method of precoding multi-carrier signals, comprising:
    obtaining a transmission channel matrix between a plurality of antennas of a terminal and a plurality of spatially separate users, wherein the transmission channel matrix includes channel estimates for a plurality of subcarriers of the multi-carrier signals;
    determining a channel dimension reduction matrix based upon a composite of the channel estimates for the plurality of subcarriers, wherein dimensions of the channel dimension reduction matrix are less than dimensions of the transmission channel matrix;
    wherein the terminal is one of a plurality of terminals interfaced with a central processing unit;
    wherein the terminal communicates with the plurality of spatially separate user with the multi-carrier signals;
    determining a precoding matrix for the terminal based on the channel dimension reduction matrix;
    determining an effective channel based on a channel estimate of a transmission channel and based on the precoding matrix of the terminal; and
    determining a precoding matrix for the central processing unit based on the effective channel, wherein the precoding matrix for the central processing unit is multi-carrier signal dependent.

2. The method of claim 1, wherein the dimensions of the channel dimension reduction matrix is determined based on a distribution of user signal power across the transmission channel.

3. The method of claim 1, wherein determining a channel dimension reduction matrix comprises determining a channel covariance matrix of the transmission channel between the plurality of antennas of the terminal and the plurality of spatially separate users.

4. The method of claim 3, wherein determining a precoding matrix for the terminal based on the channel dimension reduction matrix comprises determining the precoding matrix for the terminal based on the channel covariance matrix.

5. The method of claim 1, further comprising applying the precoding matrix of the terminal to multi-carrier signal communicated between the terminal and the plurality of spatially separate users.

6. The method of claim 1, further comprising applying the precoding matrix of the central processing unit to multi-carrier signals communicated between the central processing unit and the terminal.

7. The method of claim 1, wherein the precoding matrix of the central processing unit is updated more frequently than the precoding matrix of the terminal.

8. The method of claim 1, wherein each of the plurality of terminals serves a group of users, and wherein the central processing unit comprises a precoding matrix for each of the terminals that is constructed as a block diagonal matrix, wherein each block of the block diagonal matrix includes a precoding matrix selected for cancelling interference between users of a group of the corresponding terminal.

9. The method of claim 1, wherein the terminal comprises a remote radio head (RRH) of a C-RAN system.

10. The method of claim 1, wherein the central processing unit comprises a baseband unit (BBU) of a C-RAN system.

11. A system for precoding multi-carrier signals, comprising:
    a central processing unit operative to:
        obtain a transmission channel matrix between a plurality of antennas of a terminal and a plurality of spatially separate users, wherein the transmission channel matrix includes channel estimates for a plurality of subcarriers;
        determine a channel dimension reduction matrix based upon a composite of the channel estimates for the plurality of subcarriers, wherein dimensions of the channel dimension reduction matrix are less than dimensions of the transmission channel matrix, wherein the terminal is one of a plurality of terminals interfaced with the central processing unit, wherein the terminal communicates with the plurality of spatially separate users with multi-carrier signals;
        determine a precoding matrix for the terminal based on the channel dimension reduction matrix;
        determine an effective channel based on a channel estimate of a transmission channel and based on the precoding matrix of the terminal;
        determine a precoding matrix for the central processing unit based on the effective channel, wherein the precoding matrix for the central processing unit is multi-carrier signal dependent;
        communicate the precoding matrix for the terminal to the terminal;
        apply the precoding matrix of the central processing unit to multi-carrier signals communicated between the central processing unit and the terminal;
        wherein the terminal is operative to apply the precoding matrix of the terminal to multi-carrier signals communicated between the terminal and the plurality of spatially separate users.

12. The system of claim 11, wherein the dimensions of the channel dimension reduction matrix is determined based on a distribution of user signal power across the transmission channel.

13. The system of claim 11, wherein determining a channel dimension reduction matrix comprises determining a channel covariance matrix of the transmission channel between the plurality of antennas of the terminal and the plurality of spatially separate users.

14. The system of claim 13, wherein determining a precoding matrix for the terminal based on the channel dimension reduction matrix comprises determining the precoding matrix for the terminal based on the channel covariance matrix.

15. The system of claim 11, wherein the terminal is operative to apply the precoding matrix of the terminal to multi-carrier signal communicated between the terminal and the plurality of spatially separate users.

16. The system of claim 11, wherein the central processing unit is operative to apply the precoding matrix of the central processing unit to multi-carrier signals communicated between the central processing unit and the terminal.

17. The system of claim 11, wherein the precoding matrix of the central processing unit is updated more frequently than the precoding matrix of the terminal.

18. The system of claim 11, wherein each of a plurality of terminal serves a group of users, and wherein the central processing unit comprises a precoding matrix for each of the terminals that is constructed as a block diagonal matrix, wherein each block of the block diagonal matrix is designed as a zero-forcing matrix for cancelling interference between users of the group of the corresponding terminal.

19. The system of claim 11, wherein the terminal comprises a remote radio head (RRH) of a C-RAN system.

20. The system of claim 11, wherein the central processing unit comprises a baseband unit (BBU) of a C-RAN system.

* * * * *